United States Patent
Sheikh-Movahhed et al.

(10) Patent No.: US 8,000,669 B2
(45) Date of Patent: Aug. 16, 2011

(54) AUTOMATIC BEAT/TONE REMOVAL ALGORITHM

(75) Inventors: Mohammad Reza Sheikh-Movahhed, Ann Arbor, MI (US); Shaun David Kalinowski, Van Buren Township, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 797 days.

(21) Appl. No.: 12/045,090

(22) Filed: Mar. 10, 2008

(65) Prior Publication Data

US 2009/0227219 A1  Sep. 10, 2009

(51) Int. Cl.
*H04B 1/10* (2006.01)
*H04B 1/18* (2006.01)

(52) U.S. Cl. .......... 455/222; 455/278.1; 455/283
(58) Field of Classification Search ............. 455/222, 455/278.1, 283, 296, 67.11, 67.13, 63.1
See application file for complete search history.

(56) References Cited

U.S. PATENT DOCUMENTS

| | | | |
|---|---|---|---|
| 2,132,875 A | 10/1938 | Myers | |
| 4,525,868 A | 6/1985 | Kage et al. | |
| 4,584,714 A | 4/1986 | Fukuhara | |
| 4,607,390 A * | 8/1986 | Faugeron | 455/143 |
| 4,635,298 A | 1/1987 | Kage et al. | |
| 4,751,734 A * | 6/1988 | Rucktenwald | 381/13 |
| 4,772,853 A | 9/1988 | Hart | |
| 6,993,309 B2 | 1/2006 | Tsujishita et al. | |
| 7,142,834 B2 | 11/2006 | Miyagi | |
| 7,260,163 B2 | 8/2007 | Li et al. | |
| 7,853,195 B2 * | 12/2010 | Higgins | 455/1 |
| 2004/0142672 A1 | 7/2004 | Stankewitz | |
| 2008/0125066 A1 * | 5/2008 | Suzuki | 455/160.1 |

* cited by examiner

*Primary Examiner* — Sonny Trinh
(74) *Attorney, Agent, or Firm* — Dickinson Wright PLLC

(57) ABSTRACT

A system for detecting and removing undesirable noise, such as beats and tones, from radio signals. The system includes a manual oscillator that is a manually tuned by a user to a selected manual frequency from one of a plurality of frequencies. An electronic oscillator is electronically tuned to a selected electronic frequency from one of the plurality of frequencies. A processor isolates and stores at least one interference frequency associated the selected electronic frequency and determines a correction signal to correct any interference frequencies within a particular selected electronic frequency. The selected manual frequency is corrected using the determined correction signal for the particular selected electronic frequency when the selected manual frequency is the same as the particular selected electronic frequency.

29 Claims, 2 Drawing Sheets

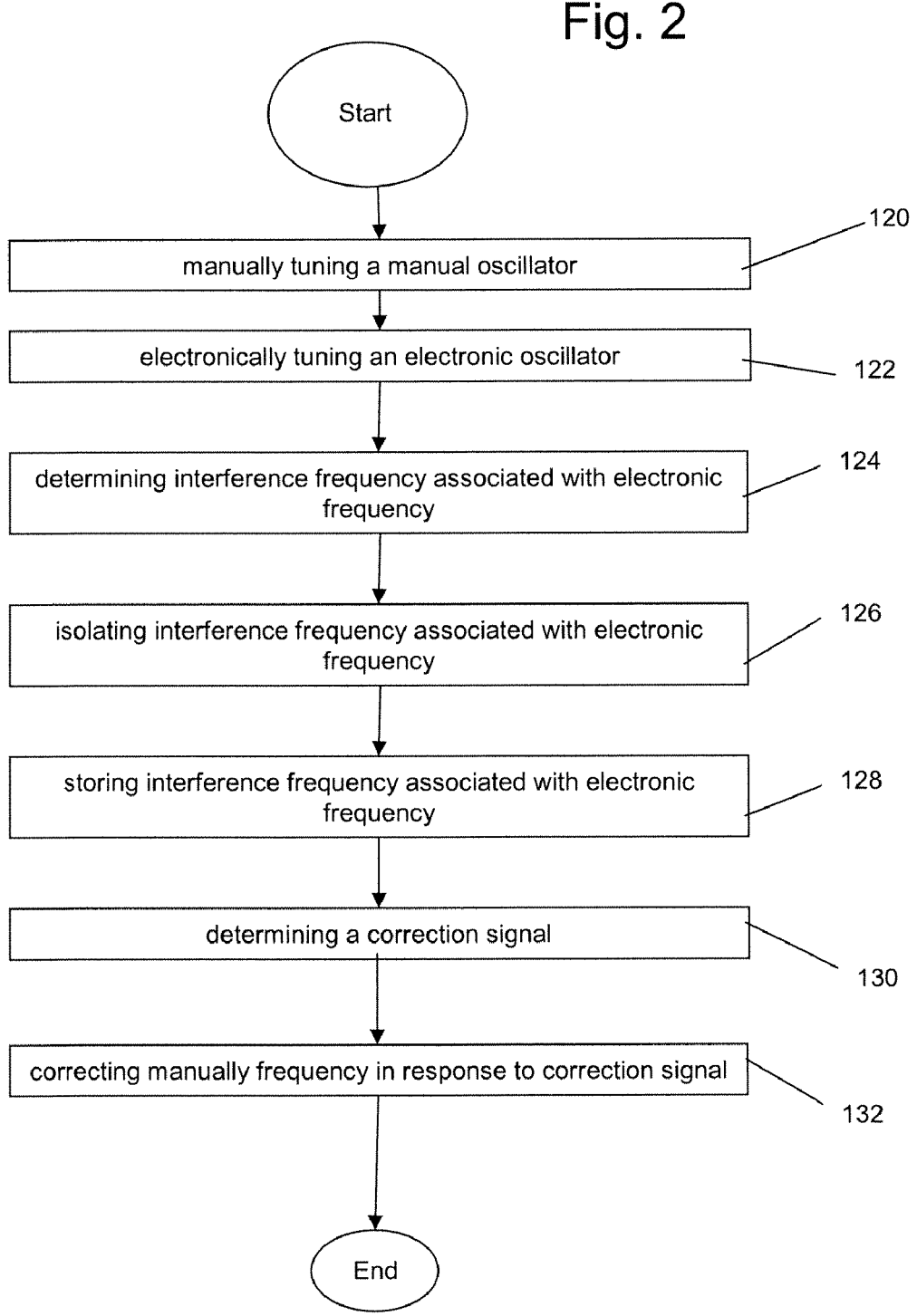

AUTOMATIC BEAT/TONE REMOVAL ALGORITHM

CROSS REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The subject invention relates to a system for detecting and removing undesirable noise from radio signals, such as beats and tones.

2. Discussion

Radio receivers and especially in vehicle mounted radio receivers are susceptible to interference noise, from a variety of sources, including electronic devices. These interference noises may be mixed into a signal received by a receiver and thereby detract from the quality of the receiver's audio output. Some of such mixed in interference noises are commonly known in the industry as beats or tones. A beat or tone is more specifically a received interference that is generally a sinusoid of large enough amplitude to interfere with the reception of the desired received signal.

Beats generally occur when two sound waves of different frequencies having alternating constructive and destructive interferences cause the sound output to be alternatively soft and loud, the frequency of which is known as a beat frequency. The beat frequency is generally equal to the absolute value of the difference in frequency of the two waves.

Tones are noise frequencies outside the desired band broadcast. When two or more tones are present outside a particular frequency, the product resulting from the mixing of these tones could manifest as a distortion, an undesirable audio tone, or even in some circumstances could overpower the desired broadcast and substantially quiet the receiver.

Traditionally, to overcome beats or tones, once a particular interference was detected, either the receiver or the interfering component, if ever found, was redesigned to eliminate the beat or tone. While redesigning a receiver to minimize internal interferences, it is much more difficult to design a receiver to minimize outside interferences. The problem with beats and tones is particularly acute when a receiver is placed in a vehicle due to the confined space being packed with a multitude of components that may cause interference. As vehicle manufactures have added numerous electronic devices, controllers, communication tools and entertainment devices, the interference of beats and tones with audio signals has increased.

Many times beats or tones first manifest in prototype versions of a vehicle making them very expensive to eliminate. To eliminate or reduce beats and tones, the component or in some circumstances the components must be found. If the component causing the interference is found, it needs to be redesigned or eliminated, typically an impractical and expensive solution given the stage of vehicle development where these interferences are typically discovered. Even if all beats or tones are found and eliminated or reduced to an acceptable level, interferences may still occur from consumer devices introduced to the vehicle environment by the user, such as, a cell phone.

As such, it is desirable to have an improved system for detecting and removing beats and noise from radio signals that is less time consuming and more cost efficient than redesigning either components or the receiver, and can address and reduce or eliminate beats or tones caused by the consumer devices.

SUMMARY OF THE INVENTION AND ADVANTAGES

The present invention is a system for detecting and removing undesirable noise in receivers, such as beats and tones, from radio signals. The beats and tones are removed through an algorithm that determines the interference on a particular frequency and then creates a correction signal such that when a user tunes to that particular frequency, the interference is removed or reduced. In operation, an electronic tuning signal, generated by a retuning system in a processor, is utilized to electronically tune the electronic oscillator to a selected electronic frequency, selected from the plurality of frequencies in the audio feed and then isolate and store at least one interference frequency associated with each frequency experiencing interference. The processor uses the interference frequency to produce a correction signal for the selected electronic frequency.

The user controls a manual oscillator that is capable of being tuned to a selected manual frequency, selected from the plurality of frequencies in the audio feed. A digital summation device responsive to the selected manual frequency uses the correction signal to reduce or mask interference frequencies with the selected manual frequency thereby producing a corrected manual frequency. The corrected manual frequency is converted to an audio output by the receiver.

While the processor may update each frequency as selected, it may also continuously choose additional selected electronic frequencies to isolate and store the interference frequency associated with each of the selected electronic frequencies experiencing interference. With each frequency having a stored correction signal and the receiver being able to constantly update these correction signals, the beats or tones are always eliminated or reduced no matter when the user manually tunes to a particular frequency.

The present invention is further directed to a method for detecting and removing noise, such as beats and tones, from radio signals through an algorithm. An electronic oscillator is electrically tuned to a selected electronic frequency from the plurality of available frequencies in response to a processor. An interference frequency associated with the selected electronic frequency of the electronic oscillator is than isolated and stored by the processor. Next, a correction signal for each of the at least one interference frequencies associated with the selected electronic frequency is produced by the processor. Finally, the correction signal produced by the processor is used to reduce or mask the interference frequencies before the audio output is provided to the user. As such, the subject invention allows for a dedicated receiver path that inspects and searches for beats and tones while the desired frequency band is independently audible to the user along a second receiver path.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

Other advantages of the present invention will be readily appreciated and more fully understood by reference to the following detailed description when considered in connection with the accompanying drawings wherein:

FIG. 2 is flow chart of an exemplary method of detecting and removing undesirable noise, such as beats and tones, from radio signals.

DETAILED DESCRIPTION OF THE INVENTION

Figure 1:
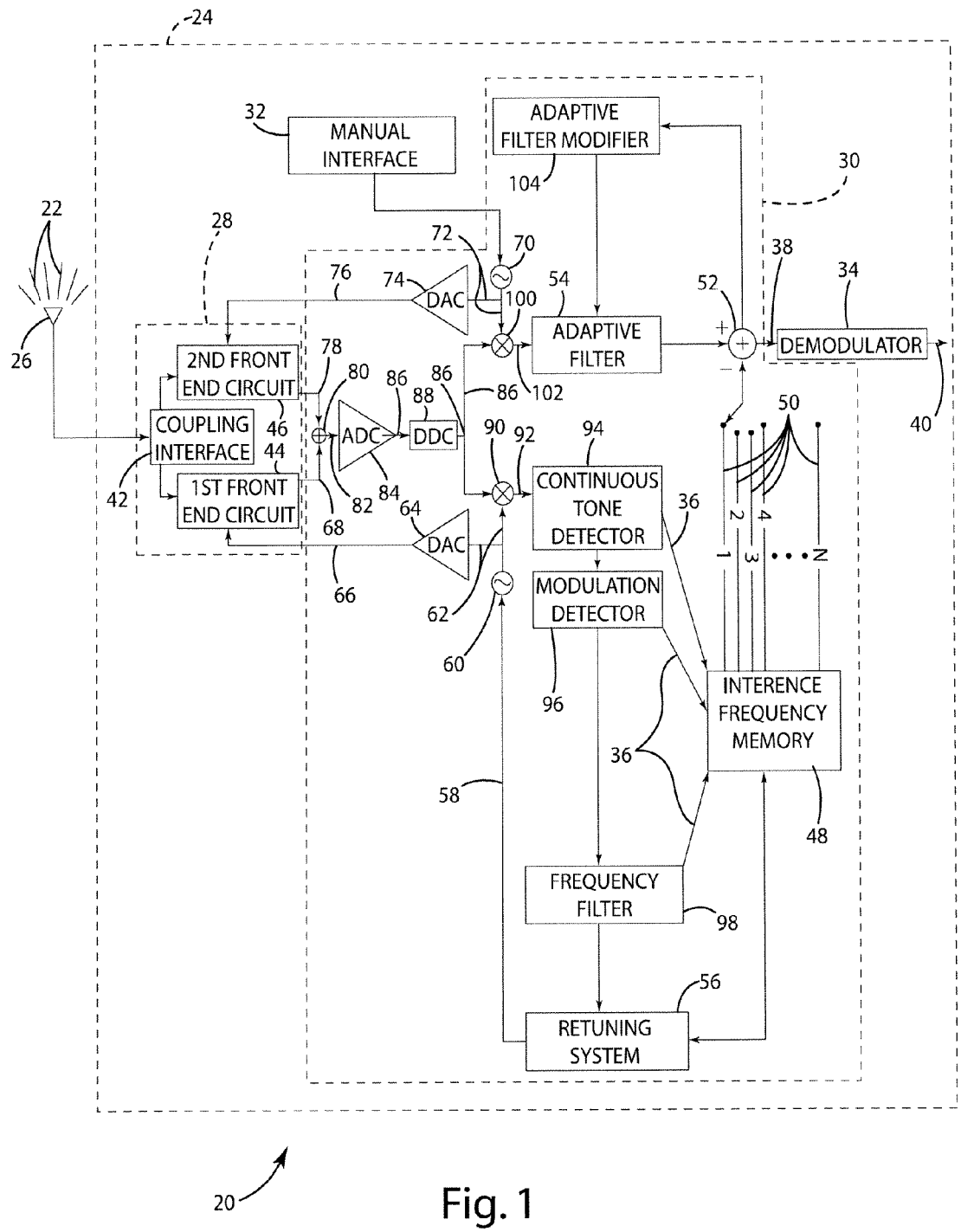
FIG. 1 is a schematic view of the system for detection and removal of undesirable noise from radio signals.

Referring to the Figures, wherein like numerals indicate corresponding parts throughout the several views, a system 20 is generally shown for detecting and removing undesirable noise, such as beats and tones, from radio signals 22 through an algorithm.

The present invention is directed to a system 20 and a method for detecting and reducing undesirable noise and interference, such as beats and tones. In general, the system 20 is typically part of a receiver 24 capable of receiving radio signals 22. The receiver 24 uses an algorithm to remove beats and tones from a selected manual frequency when the receiver 24 is tuned to the selected manual frequency. The selected manual frequency can be any of the frequencies received by the receiver 24. The selected manual frequency is typically manually tuned by a user to any one of a plurality of manual frequencies in an audio feed or radio band, but may be tuned by any other method known in the art. Exemplary audio feeds to the receiver 24 include AM frequencies, FM frequencies, satellite feeds, weather feeds and any other desirable feeds.

The system 20 generally includes the receiver 24 and an antenna 26 for receiving broadcast bands and making the selected manual frequency audible to a user. The antenna 26 may be a wand type antenna, a window antenna, a satellite antenna, a wire antenna, and any other antenna known in the art or further used with receivers 24 in the future. The antenna 26 receives broadcast signals 22 for all or selected frequencies that are then filtered and isolated at a front end circuit portion 28 in the receiver 24. The antenna 26 is capable of receiving radio signals 22 in various audio feeds. Although the present invention is illustrated and describe as only including one antenna, multiple antennas may be easily used as is well known in the art. The antenna 26 is connected to the receiver 24 through any known or later conceived methods.

The receiver 24 may be an in-vehicle receiver, a home receiver, a portable receiver, a cell phone, or any other receiver 24 known in the art. The present invention is particularly applicable to vehicle receivers and cell phone radio receiver in view of the amount interference received as compared with other types of receivers. The receiver 24 generally includes a processor 30, a manual interface 32, the front end circuit portion 28, and a demodulator 34.

In operation, the processor 30 continuously scans the plurality frequencies, or when a particular frequency is selected, hereinafter the selected electronic frequency, scans that frequency to isolate and store each interference frequency 36 associated with each frequency in the audio feed. The selected electronic frequency can be any of the frequencies received by the receiver 24. The illustrated processor 30 is capable of scanning a selected electronic frequency while the receiver 24 is manually tuned to a selected manual frequency using a manual interface 32 or the receiver 24 and more specifically the receiver 24 is capable of receiving and processing at least two frequencies at the same time. The manual interface 32 isolates the selected manual frequency, selected by a user, at the front end circuit portion 28.

The front end circuit portion 28 may include a coupling interface 42 responsive to the antenna 26 for boosting and distributing the radio signals 22 received from the antenna 26 and outputs at least one signal to the processor 30. Of course, the system 20 may be manufactured without the coupling interface 42 or may include other elements known in the art for performing similar tasks. As the receiver 24 is capable of using as least two signals at one time, the front end circuit 28 outputs at least two frequency signals. While the front end circuit 28 may be formed as one circuit or part of the processor 30, for ease of illustration and discussion, the front end circuit 28 is illustrated and discussed below as having a first front end circuit 44 and a second front end circuit 46. The first front end circuit 44 provides a frequency output for the selected electronic frequency from the radio signals 22. The second front end circuit 46 provides a frequency output for the selected manual frequency from the radio signals 22, based upon input from the manual interface 32. Of course the system 20 may have any number of front end circuits, including a single front end circuit.

The manual interface 32 allows the user to provide input to the processor 30 regarding the selected manual frequency to be isolated at the front end circuit portion 28. The manual interface 32 can be a digital tuner, a tuning knob, a remote tuner, or any method known in the art of tuning a radio to a selected manual frequency.

The receiver 24 further includes oscillators for tuning the system 20 to a particular frequency, although other devices may be used. In the illustrated embodiment, the receiver includes a manual oscillator 70 and an electronic oscillator 60 that is independent of the manual oscillator 70. The manual oscillator 70 is controlled directly or indirectly by the manual interface 32. As illustrated in FIG. 1, the manual oscillator 70 is controlled directly by the manual interface 32, however in other embodiments, the processor 30 may control the manual oscillator 70 in response to an input from the manual interface 32.

The manual oscillator 70 produces a manual digital output 72 in response to being manually tuned by the manual interface 32 to the selected manual frequency in the audio feed. A digital-to-analog converter 74, as illustrated in FIG. 1, is in communication with and responsive to the manual digital output 72 of the manual oscillator 70. The digital-to-analog converter 74 converts the manual digital output 72 to produce an analog output 76. The second front end circuit 46 is in communication with and responsive to the analog output 76 of the digital-to-analog converter 74. More specifically, the second front end circuit 46 uses the analog output 76 to select the selected manual frequencies from the radio signals 22.

The electronic oscillator 60 is controlled either directly or indirectly by the processor 30. The system 20 uses the electronic oscillator 60 to tune to a selected electronic frequency, which may or may not be the same frequency as the manual oscillator 70 is tuned to. The system 20 uses the signal from the electronic oscillator 60 to determine any interference frequencies 36 in the background without effecting the user's enjoyment of the audio output from the receiver 24.

Although the electronic oscillator 60 is illustrated as being part of the processor 30, it may be a separate component. The processor 30 further may include a retuning system 56 that produces an electronic tuning signal 58 to electronically tune the electronic oscillator 60 to a selected electronic frequency. The processor 30 in response to the electronic tuning signal produces an electronic side digital output 62.

The processor 30 further includes s digital-to-analog converter 64, illustrated in FIG. 1, in communication with and responsive to the electronic side digital output 62 of electronic oscillator 60 and disposed between the first front end circuit 44 and the electronic oscillator 60. The digital-to-analog converter 64 converts the electronic side digital output 62 to a first analog output 66. The front end circuit 44 receives the radio signals 22 from the coupling interface 42 and is in communication with and responsive to the first analog output 66 of the first digital-to-analog converter 64. As described in more detail above, the first front end circuit 44 uses the first analog output 66 to select the selected electronic frequency from received radio signals 22 and produces, provides or communicates a first analog frequency output 68 correlating to the selected electronic frequency.

The processor 30 further includes an analog summation device 80, an analog to digital converter 84, and a digital down converter 88. The analog summation device 80 is in communication with and responsive to the first and second front end circuits 44, 46 combines the first and second analog frequency outputs 68, 78 to produce a combined analog frequency output 82. The combined signal allows for the use of one analog-to-digital converter 84 as opposed to multiple converters that require space and are not cost efficient. The analog-to-digital converter 84 is in communication with and responsive to the combined analog frequency output 82 of the analog summation device 80. The analog-to-digital converter 84 samples the combined analog frequency output 82 at a predetermined sampling rate and produces a combined digital output 86. The combined digital output 86 is provided to the digital down converter 88 which converts the combined digital output 86 to a sampling rate different than the predetermined sampling rate. The digital down converter 88 is optional and the system 20 would work, with or without, this digital down converter 88.

The combined digital output 86 is then split using an electronic side mixer 90 and a manual side mixer 100. Each of the electronic side mixer 90 and manual side mixer 100 receive the same digital output 86. The electronic side mixer 90 is in communication with and responsive to the combined digital output 86 and the electronic side digital output 62 of the electronic oscillator 60. The electronic side mixer 90 produces an electronic side digital signal 92 that is correlated to the selected electronic frequency. The electronic side mixer 90 only allows the electronic side digital signal 92, correlating to the selected electronic frequency from the combined digital output 86 to pass through the electronic side mixer 90.

A manual side mixer 100 is in communication with and responsive to the combined digital output 86 and the manual digital output 72 of the manual oscillator 70. The manual side mixer 100 produces a manual side digital signal 102 that is correlated to the selected manual frequency. The manual side mixer 100 only allows the manual side digital signal 102 correlating to the selected manual frequency from the combined digital output 86 to pass through the manual side mixer 100.

The processor 30 isolates and, in the illustrated embodiment, stores at least one interference frequency 36 associated with a particular electronic frequency. To ensure the beats and tones will be removed from all possible frequencies no matter where a user manually tunes to that particular frequency, the receiver 24 preferably determines the interference frequency 36 associated with each possible frequency and stores each interference frequency 36 in a memory module, such as the illustrated interference frequency memory 48. This allows the receiver 24 to always have interference frequencies 36 determined and ready for use. The receiver 24 may do this in the background while the user is listening to other frequencies, or even when the receiver 24 is switched off in regards to audio output. Each frequency may also include multiple interference frequencies 36 that are stored for use as a particular frequency may have multiple sources of interference. The interference frequencies 36 may also be determined in real time to produce a correction signal 50 on demand. The processor may use the interference frequencies 36 to correct the selected manual frequency before it is output to the user as audio content.

The processor 30 mathematically isolates and stores, if necessary, the interference frequency 36 found in the electronic side digital signal 92 to eliminate or at least reduce interference in the receiver 24 for the selected manual frequency. The processor 30 typically uses an algorithm. Not every frequency will have an associated interference frequency 36, while others may have multiple interference frequencies 36. There is no limit to the number of interference frequencies 36 that may be in the selected electronic frequency and particularly in the electronic side digital signal 92.

The processor 30 may include a continuous tone detector 94 in communication with and responsive to the electronic side digital signal 92 of the electronic side mixer 90. The continuous tone detector 94 instantaneously monitors the electronic side digital signal 92 for a continuous tone to determine the presence of the interference frequency 36 in the electronic side digital signal 92. More specifically, any variations in continuous tone identify an interference frequency 36.

The processor 30 may include a modulation detector 96 in communication with and responsive to the continuous tone detector 94. The modulation detector 96 detects whether the electronic side digital signal 92 includes a continuous radio station-signal. The modulation detector 96 determines whether the electronic side digital signal 92 is a radio station or interference frequency 36.

The processor 30 may include a frequency filter 98 in communication with and responsive to the modulation detector 96. The frequency filter 98 filters the electronic side digital signal 92 to isolate each of the interference frequencies 36 from the continuous radio station-signal when the electronic side digital signal 92 includes the continuous radio station-signal.

As described above, the interference frequency memory 48 isolates and stores each of the interference frequencies 36 associated with the selected electronic frequency available to the radio experiencing beats and tones. The processor 30 uses the stored interference frequency 36 further to produce the correction signal 50. The correction signal 50 corrects the interference frequency 36 by addition, subtraction, multiplication and filtering.

As illustrated in FIG. 1, the interference frequency memory 48 is in communication with and responsive to the continuous tone detector 94 to store the interference frequency 36 detected at the continuous tone detector 94. The interference frequency memory 48 is in communication with and responsive to the modulation detector 96 to store the interference frequency 36 determined by the absence of the continuous radio station-signal. The interference frequency memory 48 is in communication with and responsive to the frequency filter 98 to store the interference frequency 36 when the interference frequency 36 is isolated from the continuous radio station-signal.

The retuning system 56 is in communication with and responsive to the frequency filter 98 in the absence of the interference frequency 36 being isolated from the continuous radio station-signal. The retuning system 56 is responsive to the interference frequency memory 48 in the absence of the continuous radio station-signal in the electronic side digital signal 92 at the modulation detector 96. The retuning system 56 produces the electronic tuning signal 58 to electronically tune the electronic oscillator 60 from a selected electronic frequency to another electronic frequency in the audio feed. After an interference frequency is determined and stored, the retuning system 56 may change the selected electronic frequency to a new electronic frequency to continue the process.

The correction of the selected manual frequency may occur at either an adaptive filter 54 or a digital summation device 52. Filtering of the selected manual frequency occurs at the adaptive filter 54 and modification of the selected manual frequency by addition, subtraction, or multiplication of the selected manual frequency occurs at the digital summation device 52. Correction of the selected manual frequency may include any combination of the filtering at the adaptive filter 54 and addition, subtraction, and multiplication at the digital summation device 52. The correction signal 50 communicates the correction needed for the selected manual frequency and where the correction will take place.

As described above, the manual side mixer 100 produces a manual digital side output 102. The adaptive filter 54 in communication with and responsive to the manual side digital signal 102 of the manual mixer filters the interference frequencies 36 from the manual side digital signal 102 at the adaptive filter 54. The adaptive filter 54 will adjust the manual side digital signal 102 in accordance to the correction signal 50.

The digital summation device 52 is in communication with and responsive to the adaptive filter 54 and the correction signal 50 of the interference frequency memory 48. The digital summation device 52 corrects the presence of each of the at least one interference frequencies 36 in the manual side digital signal 102 in accordance to each of the correction signals 50 generated for the manual side digital signal 102 at the interference frequency memory 48 by addition, subtraction and multiplication. The digital summation device 52 produces the corrected manual frequency 38.

An adaptive filter modifier 104 is in communication with and responsive to the digital summation device 52. The adaptive filter modifier 104 communicates to the adaptive filter 54 the presence of interference frequencies 36 in the manual side digital signal 102, so that, the adaptive filter 54 can correct the presence of each of the at least one interference frequencies 36 in the manual side digital signal 102 in response to the correction signal 50 generated for the manual side digital signal 102 by filtering at the adaptive filter 54.

The receiver 24 further includes a demodulator 34. The demodulator 34 is in communication with and responsive to the corrected manual frequency 38. The demodulator 34 converts the corrected manual frequency 38 to the audio output 40 to be amplified through a speaker to be heard by a user. Thus, the corrected manual frequency 38 is converted to the audio output 40 with the interferences, specifically the beats and tones removed. The processor 30 may continuously scan the received frequencies to isolate and store each of the at least one interference frequencies 36 associated with a particular frequency in the audio feed.

The present invention further includes a method for detecting and removing undesirable noise, such as beats and tones, from radio signals 22 through an algorithm. At anytime during the method, the receiver 24 may be manually tuned 120 using the manual oscillator 70 to select the frequency referred to as the selected manual frequency from one of a plurality of available frequencies. This is typically accomplished by a user who adjusts a radio to desired frequency input.

When the radio is connected to power, turned on or notices an interference, an electronic oscillator 60 is electrically tuned 122 to a selected electronic frequency from the plurality of frequencies in response to a processor 30. An electronic tuning signal 58 is used to electronically tune the electronic oscillator 60 to the selected electronic frequency.

Interference frequency 36 associated the selected electronic frequency of the electronic oscillator 60 is then determined 124, isolated 126 and in some embodiments stored 128 by the processor 30. The selected electronic frequency may be instantaneously monitored by the continuous tone detector 94 for a continuous tone to determine the presence of the interference frequency 36 in the one of the plurality of electronically tuned frequencies. The selected electronic frequency may be monitored by a modulation detector 96 to detect whether the selected electronic frequency includes a continuous radio station-signal. The selected electronic frequency may be further monitored by a frequency filter 98 to filter and isolate the interference frequency 36 from the continuous radio station-signal when the selected electronic frequency includes the continuous radio station-signal.

A correction signal 50 is then determined 130 for each of the at least one interference frequencies 36 associated with the selected electronic frequency by the processor 30. Finally, the selected manual frequency is corrected 132 in response to the correction signal 50 produced by the processor 30 at a digital summation device 52.

The method allows a user to listen to the selected manual frequency of the frequencies available to the receiver 24 while the receiver 24 continuous scans all available frequencies for interference frequencies 36 in each selected electronic frequency. Continuously scanning the frequencies available allows the processor 30 to be current with interference frequencies presently affecting the receiver 24. The receiver 24 may learn from its past corrections and continually update a selected electronic frequency at regular intervals.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A system for detecting and removing undesirable noise from radio frequencies comprising:
   a manual oscillator capable of tuning to a selected manual frequency within a plurality of frequencies in an audio feed;
   an electronic oscillator capable of tuning to a selected electronic frequency within said plurality of frequencies;
   a processor for tuning said electronic oscillator to said selected electronic frequency to isolate at least one interference frequency within said electronic frequency and wherein said processor produces a correction signal for each interference frequency associated with said electronic frequency; and
   a digital summation device responsive to said selected manual frequency and said correction signal, said digital summation device producing a corrected manual frequency in response to said correction signal, and wherein said interference frequencies are reduced in said corrected manual frequency in comparison to said selected manual frequency.

2. A system as set forth in claim 1 wherein said processor scans said radio frequencies to isolate and store for each radio frequency any interference frequencies.

3. A system as set forth in claim 1 wherein said processor stores each of said at least one interference frequency being isolated in an interference frequency memory.

4. A system as set forth in claim 1 wherein said processor includes a retuning system producing an electronic tuning signal to tune said electronic oscillator to said selected electronic frequency.

5. A system as set forth in claim 1 wherein said processor includes a continuous tone detector capable of monitoring said selected electronic frequency for a continuous tone to determine the presence of said interference frequencies in said selected electronic frequency.

6. A system as set forth in claim 5 wherein said processor includes a modulation detector in communication with said continuous tone detector, said modulation detector capable of detecting a continuous radio station-signal in said selected electronic frequency.

7. A system as set forth in claim 6 wherein said processor includes a frequency filter in communication with said modulation detector, said frequency filter capable of filtering said selected electronic frequency to isolate said interference frequencies from the continuous radio station-signal when said selected electronic frequency includes the continuous radio station-signal.

8. A system as set forth in claim 7 including an interference frequency memory capable of storing said interference frequencies provided by said frequency filter when said interference frequency is isolated from the continuous radio station-signal, by said modulation detector in the absence of the continuous radio station-signal, and by said continuous tone detector when said interference frequency is detected.

9. A system as set forth in claim 7 wherein said processor includes a retuning system in communication with said frequency filter, said retuning system capable of producing an electronic tuning signal to electronically tune said electronic oscillator to a new selected electronic frequency in the absence of said interference frequency being isolated from the continuous radio station-signal.

10. A system as set forth in claim 1 wherein said processor includes a retuning system producing an electronic tuning signal to electronically tune said electronic oscillator from the currently selected electronic frequency to a new selected electronic frequency.

11. A system as set forth in claim 10 wherein said electronic oscillator produces an electronic side digital output correlated to said selected electronic frequency.

12. A system as set forth in claim 11 including a first digital-to-analog converter responsive to said electronic oscillator to convert said electronic side digital output to a first analog output, and including a first front end circuit receiving radio signals from a coupling interface selecting said selected electronic frequency from the radio signals to provide a first analog frequency output in response to said first analog output.

13. A system as set forth in claim 12 wherein said manual oscillator is independent of said electronic oscillator and produces a manual digital output in response to being manually tuned to said selected manual frequency.

14. A system as set forth in claim 13 including a second front end circuit to receive radio signals and a second digital-to-analog converter responsive to said manual digital output of said manual oscillator, said second digital-to-analog converter producing a second analog output, said second front end circuit selecting said selected manual frequency in response to said second analog output of said second digital-to-analog converter to provide a second analog frequency output.

15. A system as set forth in claim 14 including an analog summation device responsive to said front end circuits for combining said first and second analog frequency outputs to produce a combined analog frequency output.

16. A system as set forth in claim 1 including an analog-to-digital converter responsive to said combined analog frequency output of said analog summation device for sampling said combined analog frequency output at a predetermined sampling rate to produce a combined digital output.

17. A system as set forth in claim 16 including a digital down converter responsive to said combined digital output of said analog-to-digital converter, said digital down converter converting the combined digital output to a sampling rate different than said predetermined sampling rate.

18. A system as set forth in claim 16 including an electronic side mixer responsive to said combined digital output and said electronic side digital output of said electronic oscillator, said electronic side mixer producing an electronic side digital signal correlated to said selected electronic frequency.

19. A system as set forth in claim 16 including a manual side mixer responsive to said combined digital output and said manual digital output of said manual oscillator, said manual side mixer producing a manual side digital signal correlated to said selected manual frequency.

20. A system as set forth in claim 19 including an adaptive filter responsive to said manual side digital signal of said manual mixer, said adaptive filter filters each of said interference frequencies from said manual side digital signal.

21. A system as set forth in claim 20 including an adaptive filter modifier, said digital summation device responsive to said adaptive filter and said adaptive filter modifier being responsive to said digital summation device to communicate to said adaptive filter the presence of said interference frequency in said manual side digital signal.

22. A system as set forth in claim 21 including a demodulator responsive to said corrected manual frequency to convert said corrected manual frequency to an audio output to be amplified through a speaker.

23. A method for detecting and removing undesirable noise, such as beats and tones, from radio signals through an algorithm comprising the steps of:
electronically tuning an electronic oscillator to a selected electronic frequency from one of a plurality of frequencies;
isolating and storing at least one interference frequency associated with the selected electronic frequency;
determining a correction signal to correct any interference frequencies within a particular selected electronic frequency;
manually tuning a manual oscillator to a selected manual frequency from one of the plurality of frequencies; and
correcting the selected manual frequencies using the determined correction signal for the particular selected electronic frequency when the selected manual frequency is the same as the particular selected electronic frequency.

24. A method as set forth in claim 23, wherein said manually tuning a manual oscillator step is further defined as adjusting a manual interface in communication with the manual oscillator by a user to the selected manual frequency the user wants to hear.

25. A method as set forth in claim 23 further comprising the step of producing an electronic tuning signal to electronically tune the electronic oscillator to the selected electronic frequency.

26. A method as set forth in claim 23 further comprising the step of detecting whether the selected electronic frequency includes a continuous radio station-signal.

27. A method as set forth in claim 23 further comprising the step of updating the interference frequencies and the correction signals associated with the selected electronic frequency to have of the interferences currently affecting the frequencies stored.

28. A method for detecting and removing undesirable noise, such as beats and tones, from radio signals through an algorithm comprising the steps of:
   electronically tuning an electronic oscillator to a selected electronic frequency from one of a plurality of frequencies;
   isolating and storing at least one interference frequency associated with the selected electronic frequency;
   determining a correction signal to correct any interference frequencies within a particular selected electronic frequency; and
   instantaneously monitoring the selected electronic frequency for a continuous tone to determine the presence of the interference frequency in the selected electronic frequency.

29. A method for detecting and removing undesirable noise, such as beats and tones, from radio signals through an algorithm comprising the steps of:
   electronically tuning an electronic oscillator to a selected electronic frequency from one of a plurality of frequencies;
   isolating and storing at least one interference frequency associated with the selected electronic frequency;
   determining a correction signal to correct any interference frequencies within a particular selected electronic frequency;
   detecting whether the selected electronic frequency includes a continuous radio station-signal; and
   filtering the selected electronic frequency to isolate the interference frequency from the continuous radio station-signal when the selected electronic frequency includes the continuous radio station-signal.

* * * * *